United States Patent [19]
Jakobi et al.

[11] Patent Number: 5,257,572
[45] Date of Patent: Nov. 2, 1993

[54] VACUUM BRAKE POWER BOOSTER WITH PISTON RETAINER ELEMENT AND VENTILATION DUCT

[75] Inventors: Ralf Jakobi, Liederbach; Michael Graichen, Langen, both of Fed. Rep. of Germany

[73] Assignee: Alfred Teves GmbH, Frankfurt am Main, Fed. Rep. of Germany

[21] Appl. No.: 918,476

[22] Filed: Jul. 22, 1992

[30] Foreign Application Priority Data

Jul. 25, 1991 [DE] Fed. Rep. of Germany ....... 4124683

[51] Int. Cl.$^5$ ............................................... F15B 9/10
[52] U.S. Cl. ...................................... 91/376 R; 92/99; 92/101
[58] Field of Search ................... 91/369.1, 369.2, 369.3, 91/376 R; 92/48, 49, 98 R, 96, 99, 101

[56] References Cited

U.S. PATENT DOCUMENTS

| | | | |
|---|---|---|---|
| 4,587,885 | 5/1986 | Boehm | 91/369.3 |
| 4,598,625 | 7/1986 | Belart | 91/369.3 |
| 4,619,185 | 10/1986 | Mori et al. | 91/369.3 |
| 4,951,550 | 8/1990 | Ohki et al. | 91/369.3 |
| 4,953,446 | 9/1990 | Fecher et al. | 91/369.3 |
| 5,076,142 | 12/1991 | Steer et al. | 91/369.3 |
| 5,121,674 | 6/1992 | Uyama | 91/369.3 |

FOREIGN PATENT DOCUMENTS

| | | |
|---|---|---|
| 0220078 | 12/1988 | European Pat. Off. . |
| 3113271 | 10/1982 | Fed. Rep. of Germany . |
| 3332546 | 3/1985 | Fed. Rep. of Germany . |
| 3900416 | 7/1990 | Fed. Rep. of Germany . |
| 9102670 | 3/1991 | PCT Int'l Appl. . |
| 2116270 | 9/1983 | United Kingdom . |

Primary Examiner—Edward K. Look
Assistant Examiner—Hoang Nguyen
Attorney, Agent, or Firm—Robert P. Seitter; J. Gordon Lewis

[57] ABSTRACT

A vacuum brake power booster is described wherein the return movement of a valve piston actuating a control valve is limited by a U-shaped element (17) slidable into a control housing (11). In order to improve the ventilation of the working chamber of the brake power booster initiated on actuation and to shorten the booster's response time, exit areas (42, 43, 44, 45) of ventilation ducts (38, 39, 40, 41) permitting an air flow into the working chamber (3) are formed radially outwardly of an area in the control housing (11) between the arms of the U-shaped element (17), the exit areas being confined by the outside walls (34, 35, 36, 37, 46, 47, 48, 49) of air evacuation ducts (28, 29, 30, 31) interconnecting the working chamber (3) and a vacuum chamber (4).

6 Claims, 2 Drawing Sheets

VACUUM BRAKE POWER BOOSTER WITH PISTON RETAINER ELEMENT AND VENTILATION DUCT

BACKGROUND OF THE INVENTION

The present invention relates to a vacuum brake power booster of a type comprising a booster housing which is sealingly subdivided into a vacuum chamber and a working chamber by an axially movable wall. A control valve is mechanically operable by a brake pedal actuated valve piston to controllably connect the working chamber to the vacuum chamber or to the atmosphere. The axially movable control housing incorporates evacuation ducts and ventilation ducts which permit evacuation and ventilation to the atmosphere of the working chamber. The movement of the valve piston in the direction opposite to the actuating direction is limited by a U-shaped element which is vertically insertable into the control housing, and the preferably diametrally oppositely extending evacuation ducts lie radially outside of the area between the arms of the U-shaped element.

A vacuum brake power booster of this type is known from the published international application No. WO 91/02670. The element limiting the axial return movement of the valve piston in the control housing is arranged in the exit area of the ventilation ducts in the known brake power booster, which exit area lies within a space bounded by the arms of the U-shaped element. The air flow introduced into the working chamber on actuation is restricted thereby, the response times of the known brake power booster being impaired as a result. What is also disadvantageous are the air turbulences forming in this area which cause disturbing air noises during the actuation.

Likewise the uneven distribution of the plastics material of the control housing is to be considered less favorable, which results in out of round shape during manufacture, and which is due to the evacuation ducts being designed in the control housing and extending radially oppositely outside of the arms of the U-shaped element.

Therefore, it is the object of the present invention to improve upon a vacuum brake power booster of the type described so as to improve air flow and thereby accomplish a shortening of the response time. Further, the noises occurring on actuation are to be reduced to a large extent or entirely eliminated,.

SUMMARY OF THE INVENTION

This object is achieved according to the present invention in that the exit areas of the ventilation ducts are arranged radially outside of the area limited by the arms and are defined by outside walls of the evacuation ducts. These measures serve to considerably augment the total exit area of the ventilation ducts, thereby achieving an unhindered air flow into the working chamber.

In an improvement upon the subject matter of the present invention, two further evacuation ducts lying symmetrically diametrally opposite each other are arranged in the area disposed between the arms of the U-shaped element. Owing to the mentioned arrangement of the evacuation ducts being distributed relatively evenly on the periphery of the control housing, advantages are achieved also in the manufacture of the control housing. These advantages reside in the better material flow and hence in rounder parts, on the one hand, while lower internal stresses occur, on the other hand, so that parts of greater strength are obtained.

The U-shaped element can be designed either as a flat stamped part or as a formed part made of a material with a circular or polyhedral cross-section.

A proper positioning of the U-shaped element in the control housing is attained in another improvement of this invention in that the distance between the arms corresponds to the distance between the outwardly lying surfaces of the radially extending walls which define the further evacuation ducts, with the ends of the arms being of hooked design and gripping behind the wall which radially outwardly bounds one of the further evacuation ducts. A web interconnecting the two arms is abutting on the wall defining the other evacuation duct radially outwardly. Mounting of the U-shaped part from both sides is permitted by these measures.

The present invention will be described in more detail in the following description with reference to an embodiment illustrated in the accompanying drawings.

DETAILED DESCRIPTION

Figure 1:
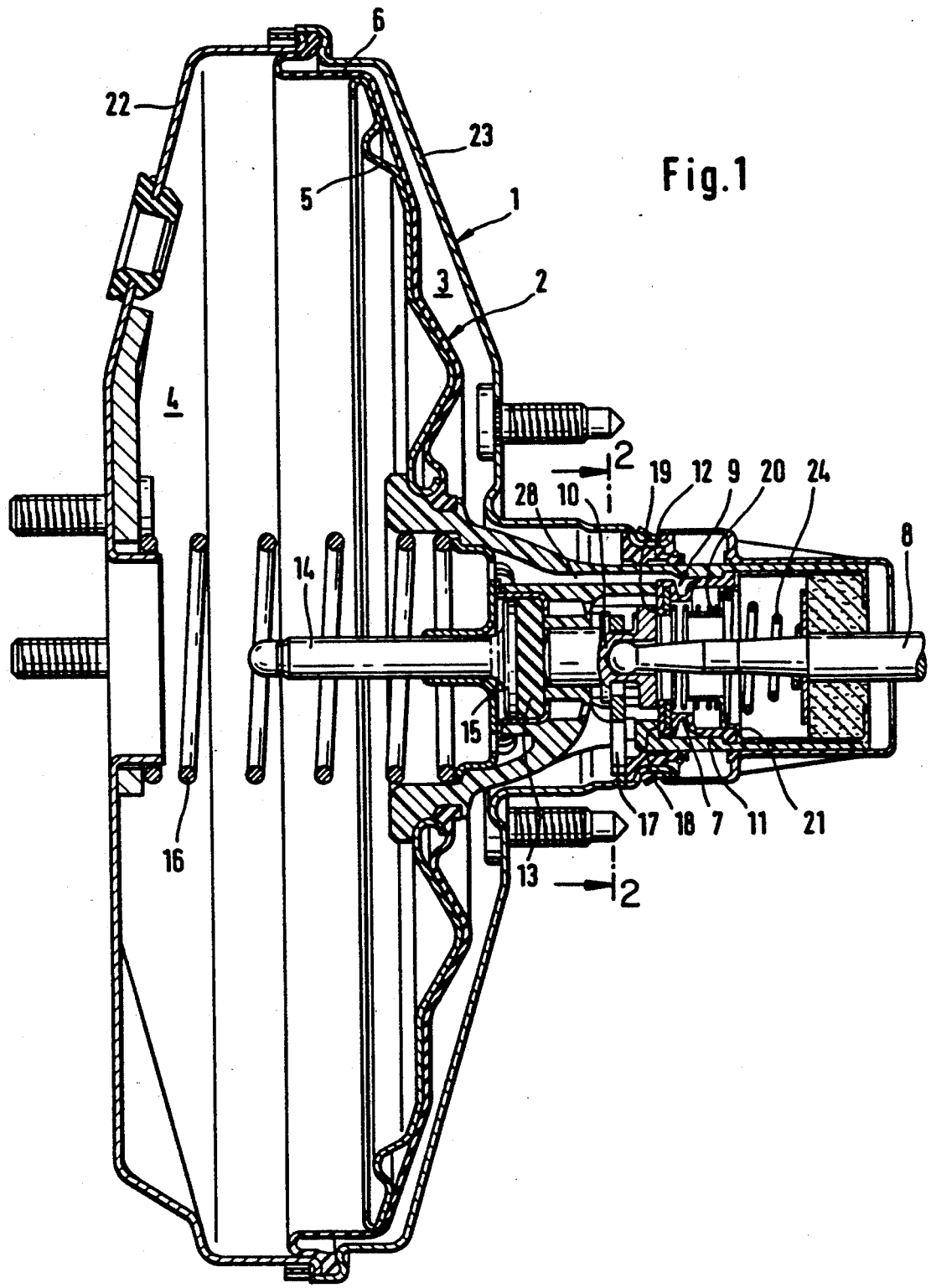
FIG. 1 is a vacuum brake power booster according to the invention shown in an axial cross-section taken along the line of intersection 1—1 in FIG. 2.

The vacuum brake power booster shown in the drawing comprises a booster housing 1 formed of two interconnected housing parts 22, 23 and subdivided into a working chamber 3 and a vacuum chamber 4 by an axially movable wall 2. The axially movable wall is composed of a diaphragm plate 5 deepdrawn from sheet metal and a flexible diaphragm plate 5 deepdrawn from sheet metal and a flexible 6 diaphragm abutting thereof which forms a rolling diaphragm as a seal between the outer circumference of the diaphragm plate 5 and the vacuum housing 1.

A control valve means 9 actuatable by an actuating rod 8 includes a control housing 11 which is guided in the booster housing part 23 sealed by a ring seal 12 and which carries the movable wall 2. The control valve means also includes a first sealing seat 18 on the control housing 11, a second sealing seat 19 on an axially slidable valve piston 10 received in an opening in the control housing 11, connected to the actuating rod 8, and a poppet valve member 7 cooperating with the two sealing seats 18, 19. The poppet valve member 7 is urged against the valve seats 18, 19 by a compression spring 20 which is compressed against a retaining sleeve 21 retaining the member 7 in the control housing 11.

Via a rubber-elastic reaction element 13 received in a frontal recess of the control housing 11 as well as via a push rod 14 having a head flange 15, the brake force is transmitted onto an actuating piston of a non-illustrated master cylinder of the brake system which is attached to the brake power booster on the vacuum size in the well known manner.

A resetting spring 16 is supported on a flange at the vacuum-side end wall of the booster housing 1 and keeps the movable wall 2 in the initial position shown. Further, a valve-piston return spring 24 is provided which is interposed between the poppet valve member 7 and a bead on the actuating rod 8, the force of which ensures a bias of the valve piston 10 and valve seat 19 in relation to the poppet valve member 7.

The restoring movement of the valve piston 10 is limited by a U-shaped element 17 which is slid into the control housing 11 vertically in relation to the longitudinal axis of the brake power booster and which, in the release position, is in axial abutment on a ring seal 12 sealedly guiding the control housing 11 in the booster housing part 23. The U-shaped element 17 which can be formed by a flat stamped part or a formed part made of a suitable material of round or polyhedral cross-section, comprises two parallel arms 25, 26 spaced at a distance from each other which define an area in the control housing 11, the meaning of which will be explained hereinbelow, the arms 25, 26 being interconnected by means of a transversely extending web 27.

Figure 2:
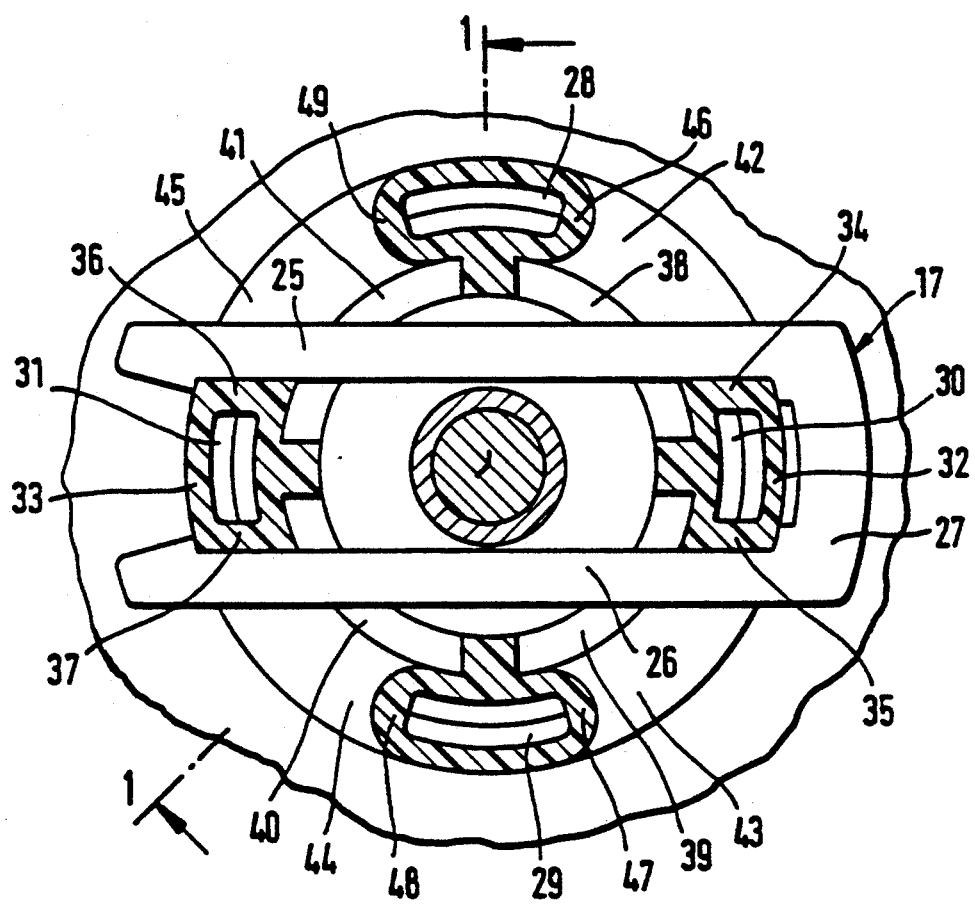
FIG. 2 is a cross-section through the vacuum brake power booster of FIG. 1, taken along the line of intersection 2—2 of FIG. 1, on an enlarged scale.

As can be seen in FIG. 2, the control housing 11 is formed with four evacuation ducts 28, 29, 30, 31 in total which permit evacuation of the working chamber 3 through the vacuum chamber 4 and which, lying in pairs diametrally opposite, are symmetrically arranged about the periphery of the control housing 11. Preferably, the arrangement of the evacuation ducts 28, 29 is chosen to such that, while evacuation ducts 28, 29 extend radially outside of the area defined by the arms 25, 26, the evacuation ducts 30, 31 are disposed inside the mentioned area. That is to say, that they are embraced by the U-shaped element 17.

The transversely extending web 27 of the element 17 is abutting on a wall 32 which bounds the evacuation duct 30 towards the outside, while the arms 25, 26 at their ends are of hooked design so that they grip behind the wall 33 which bounds the evacuation duct 31 towards the outside. The distance between the two arms 25, 26 of the U-shaped element 17 is chosen such that it corresponds to the distance between the outside surface of the radially extending walls 34, 35 and 36, 37, respectively, in the area of motion of the U-shaped element 17 in the control housing 11, the walls bounding the evacuation ducts 30, 31.

In order to be able to connect the working chamber 3 to the atmosphere when the control valve means 9 is actuated, four ventilation ducts 38, 39, 40, 41 in total, which are ring-segment-shaped in cross-section, are provided in the control housing 11, whose radially extending exit area 42, 43, 44 and 45 preferably are confined by the walls 46, 34, 35, 47, 48, 37, 36 and 49 bounding the individual evacuation ducts 28, 29, 30, 31.

Owing to the inventive design of the evacuation ducts 28 to 31 and the ventilation ducts 38 to 41, large-surface exit areas 42 to 45 of the ventilation ducts 38 to 41 are made available which lie outside of the area enclosed by the U-shaped element 17 so that on actuation a quick, unhindered air flow into the working chamber 3 of the vacuum brake power booster is achieved.

We claim:

1. A vacuum brake power booster comprising a booster housing, an axially movable wall sealingly subdividing said booster housing into a vacuum chamber and a working chamber by an axially movable wall, a mechanically operable control valve means including a valve piston, said control vale means responsive to movement of said vale piston in an actuation direction to alternatively connect said working chamber to said vacuum chamber or to the atmosphere, respectively, said control valve means also including an axially movable control housing having an internal opening receiving said valve piston, and also having evacuation ducts and ventilation ducts formed therein which permit evacuation and ventilation, restrictively, of said working chamber, a U-shaped element having a pair of arms occupying a radial space and spaced apart to form an area lying between said pair of arms, said valve piston passing through said area between said pair of arms so as to be straddled thereby, fixed structure engaged by said U-shaped element upon continued movement thereof in a direction opposite said actuating direction so as to limit moment of said valve piston in said direction opposite to said actuating direction, said U-shaped element extending through a transverse opening in said control housing and wherein diametrally oppositely extended evacuation ducts defined by outside walls are disposed radially outside of said area lying between said arms of said U-shaped element, said ventilation ducts having exit portions lying substantially entirely radially outside of said radial space occupied by said pair of arms and defined in part by portions of said outside walls of said evacuation ducts.

2. A vacuum brake power booster as claimed in claim 1, further including two additional evacuation ducts each defined by outside wall and extending symmetrically diametrally opposite each other and arranged in said area between said arms of said U-shaped element.

3. A vacuum brake power booster as claimed in claim 1 wherein said U-shaped element is a flat stamped part.

4. A vacuum brake power booster as claimed in claim 1 wherein said U-shaped element is a formed part.

5. A vacuum brake power booster as claimed in claim 2, wherein the distance between said arms corresponds to a distance between outwardly lying surfaces of radially extending portions of said outside walls which define said additional evacuation ducts, said pair of arms having hooked ends gripping behind a portion of one of said outside walls which radially outwardly bounds said one of said additional evacuation ducts.

6. A vacuum brake power booster as claimed in claim 5, wherein said arms of said U-shaped element are connected by a transversely extending web, said web abutting on a portion of said outside wall of the other of said additional evacuation ducts.

* * * * *